United States Patent
Ozbek

[19]

[11] Patent Number: 5,971,095
[45] Date of Patent: Oct. 26, 1999

[54] NOISE FILTERING METHOD FOR SEISMIC DATA

[75] Inventor: Ali Ozbek, Milton, United Kingdom

[73] Assignee: Schlumberger Technology Corporation, Sugar Land, Tex.

[21] Appl. No.: 09/091,895

[22] PCT Filed: Jan. 8, 1997

[86] PCT No.: PCT/GB97/00055

§ 371 Date: Dec. 7, 1998

§ 102(e) Date: Dec. 7, 1998

[87] PCT Pub. No.: WO97/25632

PCT Pub. Date: Jul. 17, 1997

[30]     Foreign Application Priority Data

Jan. 9, 1996 [GB]  United Kingdom ............... 9600341

[51] Int. Cl.$^6$ ..................................................... G01V 1/00
[52] U.S. Cl. ............................. 181/112; 367/43; 367/45
[58] Field of Search .................... 181/108, 112; 367/38, 43, 45, 907

[56]     References Cited

U.S. PATENT DOCUMENTS

4,750,156  6/1988  Abrams et al. ............................ 367/43
4,890,264  12/1989 Crews et al. ............................. 367/45

*Primary Examiner*—Khanh Dang
*Attorney, Agent, or Firm*—Peter Y. Lee; Keith G. W. Smith; William B. Batzer

[57]     ABSTRACT

A method for filtering noise from discrete noisy seismic signals in a time interval ([1, . . . , T]) is provided. The method comprising the steps of using the noisy seismic signals for determining at least one reference channel (x(t)) for the time interval as an estimate of the noise; determining coefficients for M temporally local filters (w(i, t)), the filters forming a filter bank, and M being a number equal to or larger than two, by minimizing a cost function (J(t)) representing a measure of the error of the output of the filter bank, and applying the filter bank to at least one estimate (x(t)) to determine M filtered estimates of the noise. The filtered estimates are multipled with temporal windows (h(i, t)).

17 Claims, 7 Drawing Sheets

NOISE FILTERING METHOD FOR SEISMIC DATA

The present invention relates to a method of filtering noise from data signals, and in particular to the filtering of noise so as reduce the effect of coherent noise on data signals acquired during seismic investigations.

BACKGROUND OF THE INVENTION

In land seismic surveys, a source induces seismic waves at or near the surface of the earth. These waves propagate through the earth and reflections from different layers within the earth can be detected by sensors, or geophones, at the earth's surface. The seismic source vibrations applied to the earth's surface also generate a so-called surface wave or ground roll which propagates through the shallow layers of the earth. At the geophones, the time of incidence of the low frequency, low speed ground roll typically coincides with the incidence of reflections from the deep layers of interest in the seismic survey. The simultaneous presence of the ground roll with the reflected signals makes it difficult to make full use of the seismic data as the ground roll often masks the reflected waves.

Several methods are known for attenuating ground roll interference and thus reducing its effect on the seismic signal of interest. Typically, geophones are not used individually, but rather are connected in sub-arrays, or groups, which are hard-wired or summed together. This is a form of data-independent beamforming. Attempts have also been made to apply adaptive signal processing for the suppression of ground roll in seismic surveys.

U.S. Pat. No. 4,556,962 attempts to attenuate the ground roll from a surface seismic source by placing a sensor close to the source to detect the interfering noise. The interfering noise is scaled, delayed and summed with signals from a more distant geophone array and then cross-correlated with the original vibrational source. This Patent also suggests that an adaptive filter be used so as to modify the delayed signal to correspond more closely to that detected by the more distant geophone array. However, the ground roll measured close to the source may be substantially different from that received by the geophone array, and the adaptive filter may not be able to deal with this.

In U.S. Pat. No. 4,890,264 a method for suppressing non-uniformly distributed noise generated by surface wave propagation, wind, and machinery is described. Horizontal geophones for detecting surface waves are used with conventional vertically orientated geophones for detecting seismic energy. The outputs of the surface wave detectors are used in conjunction with an adaptive filter to cancel the effects of the surface wave interference. This method for the suppression of ground roll is inherently a multicomponent method. Some seismic wave energy also gets detected by the horizontally sensitive geophones, and this may cause signal cancellation.

In UK Patent Application GB-A-2273358 the use of linearly constrained adaptive beamforming and adaptive interference cancelling beamforming for ground roll suppression was proposed. This method filters signals measured by an array of geophones and sums them in such a way as to preserve signals incident from a preferred direction while suppressing interference incident from other directions. The filtering is performed using a continuously adaptive method with the moveout differential between the seismic reflections and the ground roll being used to form primary and reference channels. The suggested application is in drilling when using a drill as a seismic source, where the ground roll is effectively stationary due to the slow travel of the drill bit and each source receiver position produces a lot of data. This ensures that the stochastic gradient type of algorithms used in the adaptive filters of this method are able to converge. However, in surface seismic experiments the ground roll present is often non-stationary and inhomogeneous and the stochastic gradient type of algorithms may be too slow to converge within the signal envelope.

U.S. Pat. No. 5,237,538 proposes a method for removing coherent noise from seismic data. This method firstly identifies the moveout characteristics of the noise, defines and extracts a space-time gate containing the noise, and removes the moveout to flatten the noise train. Amplitudes and time variations are then removed from the gate. The coherent noise is estimated using a beamsteer operator (conventional stacking in this case) or by f-x filtering in the Fourier tranform domain. The filtered noise estimate is subtracted from the data trace containing the signal-plus-noise using a short three to five point single filter. Inverse amplitude scalars are applied to undo the effect of earlier amplitude equalisation. The signal is then moveout restored into the original seismic record. This method has some particular shortcomings for application for ground roll attenuation. First of all, especially for shorter arrays, the signal always leaks into the ground roll estimate. In fact, there is always a component of the signal present at the reference channel which is colocated in time with the signal in the primary channel. On the other hand, when the arrays are allowed to be longer, the dispersion present in the ground roll make it difficult to achieve effective beamsteering.

SUMMARY OF THE INVENTION

In accordance with the present invention, a method for filtering noise from discrete noisy seismic signals in a time interval ([1, ..., T]), said method comprising the steps of using said noisy seismic signals for determining at least one reference channel ($x(t)$) for said time interval as an estimate of said noise;

determining coefficients for M temporally local filters ($w(i,t)$), said filters forming a filter bank, and M being a number equal to or larger than two, by minimizing a cost function ($J(t)$) representing a measure of the error of the output of said filter bank; and applying said filter bank to said at least one estimate ($x(t)$) to determine M filtered estimates of said noise.

Preferably the cost function ($J(t)$) is temporally global, representing a measure of the error of the total output of said filter bank in the time interval([1, ..., T]).

Further the cost function ($J(t)$) may be minimized using the approximation that the sum, weighted by window functions, of the output of adjacent filters of the M filters ($w(i,t)$) is equal when applied to the same signal in time regions where said window functions overlap.

Preferably the method includes the step of multiplying M filtered estimates with temporal window functions (($h(i,t)$)).

The temporal window functions may be characterized by the requiement that only adjoining windows overlap.

The application of the temporal window functions, and hence the resulting temporal windows, to the combined components ensures that the filtering means is local in time and allows the method adaptively to remove noise from the seismic data in accordance with a global optimisation criterion, e.g. to solve the optimisation of the filtered signal by minimising the mean square value of the filtered signal over time.

The invention is applicable for two-dimensional (2D) and three-dimensional (3D) seismic surveys, and can be used in land seismic, marine seismic including sea bottom seismic, and transitional zone seismic.

The method can be performed on stored data or on raw seismic data as it is acquired. Thus raw seismic data may be filtered according to the method at the data acquisition site. This ensures that a "cleaned" signal is available from the data acquisition site and may be downloaded directly from the site in this form. This reduces the amount of data that must be sent for analysis off-site and reduces the costs and storage problems associated with accumulating sufficient quantities of noisy data for analysis off-site. The method can be applied to single-sensor recordings, i.e. to recordings prior to any group forming which combines the signals of two or more seismic sensors.

The noise or reference signal may be pre-processed before being passed to the adaptive filtering means by dividing the signal into different frequency bands, for example by using a quadrature mirror filter. This allows a reduction in the number of data points to be processed and also allows a reduction in the number of coefficients in the adaptive filtering means.

The data selection temporal window functions are preferably determined by two requirements, wherein the first requirement is that the sum over all windows at any given time equals unity and the second requirement is that only adjoining windows overlap. These requirements ensure that the global optimisation of the filtered signal can be solved by use of an approximation in which for the sum over all time and all filters and all neighbouring filters, the error function of a neighbouring filter is replaced with the error function associated with the filter itself.

The application of the data selection temporal windows decouples the equation required to solve the optimisation of the filtered signal. The resulting decoupled equation may for example be solved by the method of principal components or alternatively a damped least squares approach.

Where the decoupled equation is solved using the method of principal components, the number of principal components may be adjusted to vary the degree of filtering and achieve the desired accuracy of filtering. The smaller the signal to noise ratio, the greater the number of principal components that are used to achieve filtering.

Preferably the adaptive filtering is achieved by use of a filtering means, or filtering bank, comprising a plurality of local filters. Each local filter may be multichannel filter. In a further preferred embodiment of the invention, the another signal is used to partially configure the adaptive filtering.

In land based surveys, the seismic data signals for use in methods in accordance with the invention may be acquired from at least two seismic sensing means, typically geophones, the sensing means being arranged in a net, where each sensing means is independent of the other, and each sensing means sends data signals to a processing means on site to be filtered in accordance with the invention. A net is defined as an areal array of sensing means, or geophones, where each sensing means is independent of all other sensing means in the net. This differs from prior art arrangements where each geophone is arranged in an interconnected array and the signals received by the geophones are averaged over the array in an attempt to reduce noise effects such as ground roll prior to data processing off-site.

In a further embodiment of the invention, the filtered output signal may be reprocessed in an iterative manner to a further filter the noise, the filter output signal typically being fed back to at least one of the reference signal and filtering means.

The reference signal may be generated by a number of techniques, of which one example is by moveout differentiation of the data signals.

In another technique the reference signal may be obtained by median stacking. This suppresses seismic signals that do not have the same moveout as the noise to be filtered. Thus the contamination of the reference signal with the seismic signal of interest is reduced.

In a combination of these two techniques, median stacking may be followed by moveout differentiation of the stacked signals.

Where the seismic data is obtained from multicomponent sensing means, the reference signal may be obtained by polarisation filtering of each component sensed by the sensing means. This method may be used to enhance the reference signals from adjacent sensing means which is of particular advantage for three dimensional exploration, i.e. three component, and may also be combined with moveout differentiation.

These and other features of the invention, preferred embodiments and variants thereof, possible applications and advantages will become appreciated and understood by those skilled in the art from the detailed description and drawings following hereinbelow.

EXAMPLE(S)

Figure 1:
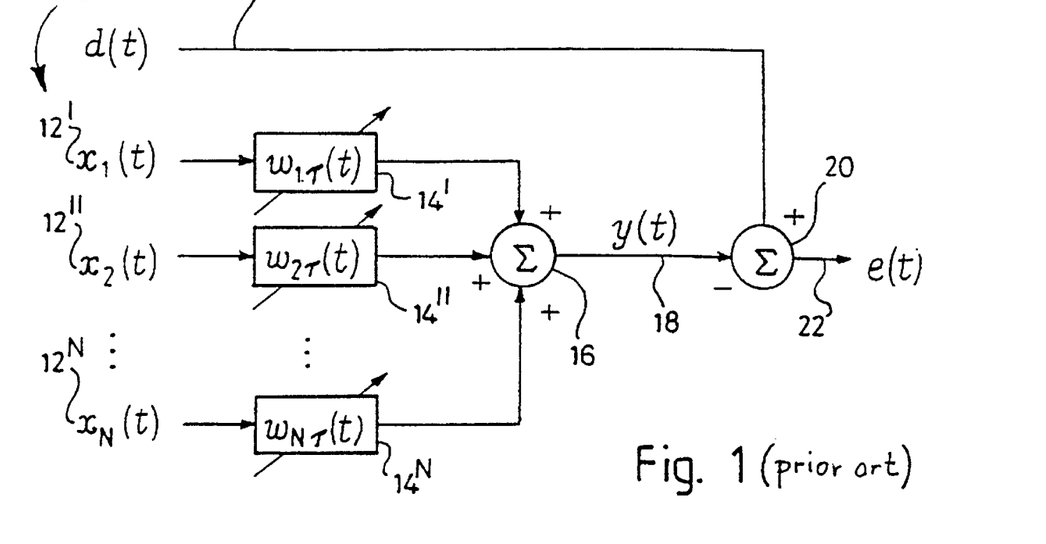
FIG. 1 shows a processing block diagram of a prior art method for adaptive cancelling using a beamforming method.

Referring now to the drawings, FIG. 1 shows a linearly constrained adaptive multichannel beamforming array as described for example in GB-A-2273358. The system inputs 10, 12 are derived from two sets of sensors, one input 10 being from a primary source or sensor and successive inputs 12', 12'', ..., $12^N$ from reference sources or auxiliary sensors. The input 10 comprises an information bearing signal corrupted by noise.

The reference inputs 12', 12'', ... $12^N$ are processed by an adaptive multichannel filter comprising local adaptive filters 14', 14'', ..., $14^N$ and the processed components combined at a summing means 16 to produce an output signal y(t) 18.

The filtering is performed using a time-continuously adaptive method, i.e. the least-mean-square (LMS) method to optimize the performance of the filter. However, stochastic gradient type algorithms such as least mean square may be too slow in converging to produce an estimate of the signal without noise when incoherent noise is non-stationery and inhomogeneous, such as those encountered in surface seismics. Ground roll noise is in general: dispersive, and as such often displays non-stationary behaviour.

The method of adaptive interference cancelling according to the invention estimates the phase and amplitude perturbation effects alongside the seismic signal propagation effects while the adaptive filter coefficients are computed. This makes the adaptive interference cancelling approach robust to phase and amplitude perturbations present in the data.

Figure 2A:
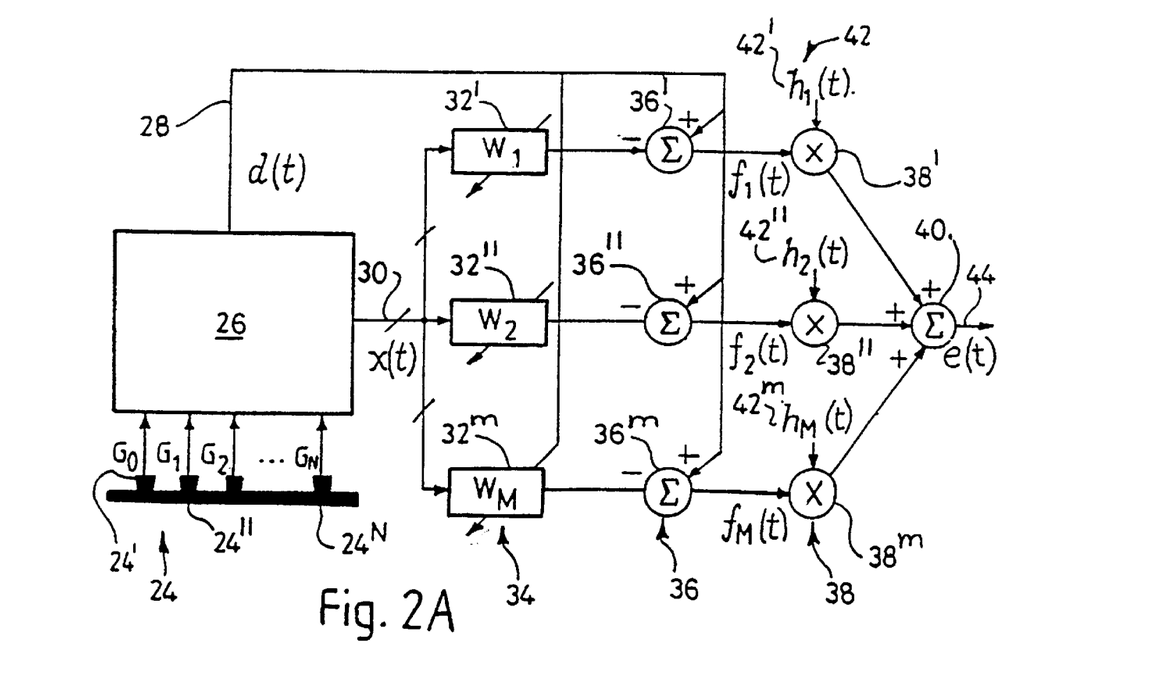
FIG. 2A shows a method of adaptive interference cancelling in accordance with the invention.

FIG. 2A shows a system for performing a method of filtering noise from a seismic signal in accordance with the invention. The system comprises a plurality of geophones $G_n$, n=1, ..., N $24', 24'', \ldots 24^N$, which record signal of the general form $\{g_{nj}(t): n=1, \ldots, N; j=1,2,3\}$, where j refers to a multicomponent recording, e.g a 3C geophone recording. To avoid confusion with FIG. 1, it should be noted that the letter N now is used to denote the number of sensors, whereas the letter K (see below) refers to the maximum number of reference channels.

The geophones 24 are separate sensors placed on the earth's surface in a net to detect seismic waves produced by reflection at layers within the earth in response to a source wave. The geophones are not linked to each other and act to provide a number of inputs to the primary and reference channel generator 26. Equivalent systems using pressure sensors, e.g. hydrophones, instead of geophones may be used.

A signal generator 26 receiving said recorded signals designates primary signal channel d(t) 28 which carries the information-bearing signal s(t) corrupted by additive interference $n_0$ (t) according to $$d(t)=s(t)+n_0(t) \quad [1]$$

and interference reference signal channels $x_k$ (t) 30:

$$x_k(t)=F\{g_{nj}(t)\} \quad [2]$$

with k=1, ..., K denoting the number of reference channels. The operator F can be any operation acting on the recorded signals so as to generate one or more reference channels, which can be regarded as first estimates of the additive interference. Hence, it is assumed for the following that the correlation of the signal s(t) with the interference in the primary channel, $n_o(t)$, and with the reference channels $x_k(t)$ is negligible compared to the correlation of $n_o(t)$ with $x_k(t)$. Examples for the operator F can be chosen from a broad variety of methods known as such. Some particularly advantageous methods for generating the reference signal 30 are discussed below.

The reference channels $x_k(t)$ are processed by a number of local adaptive filters $32', 32'', \ldots 32^k$ arranged as an adaptive filter bank 34, summation means $36', 36'', \ldots 36^M$, multiplication means $38', 38'', \ldots 38^k$ and combining means 40 to produce the output signal $$y(t) = \sum_{i=1}^{M} \sum_{k=1}^{K} \sum_{\tau=0}^{L-1} h_i(t) w_{ik\tau} x_k(t-\tau) \quad [3]$$

where $w_{ik\tau}(t)$ are the adjustable coefficients of the adaptive filters, $h_i(t)$ are the windows applied at the output end, M is the number of local multichannel adaptive filters (or the number of output windows), and L is the number of coefficients per channel. Each adaptive filter may be a multichannel filter of the type shown in FIG. 1.

Equation [3] can be rewritten as a (windowed) sum over a scalar product using a tap-input vector x(t) at time t defined as:

$$x(t) \equiv [x_1(t), \ldots, x_1(t-L+1),$$
$$x_2(t), \ldots, x_2(t-L+1), \quad [4]$$
$$x_K(t), \ldots, x_K(t-L+1)]^T$$

and a tap-weight vector $w_i$ defined as $$w_i(t) \equiv [w_{i10}(t), \ldots, w_{i1(L-1)}(t-L+1),$$
$$w_{i20}(t), \ldots, w_{i2(L-1)}(t-L+1), \quad [5]$$
$$w_{iK0}(t), \ldots, w_{iK(L-1)}(t-L+1)]^T$$

The filter bank output is combined with the primary input to produce a filtered output signal e(t) 44, where $$e(t)=d(t)-y(t). \quad [6]$$

Figure 2B:
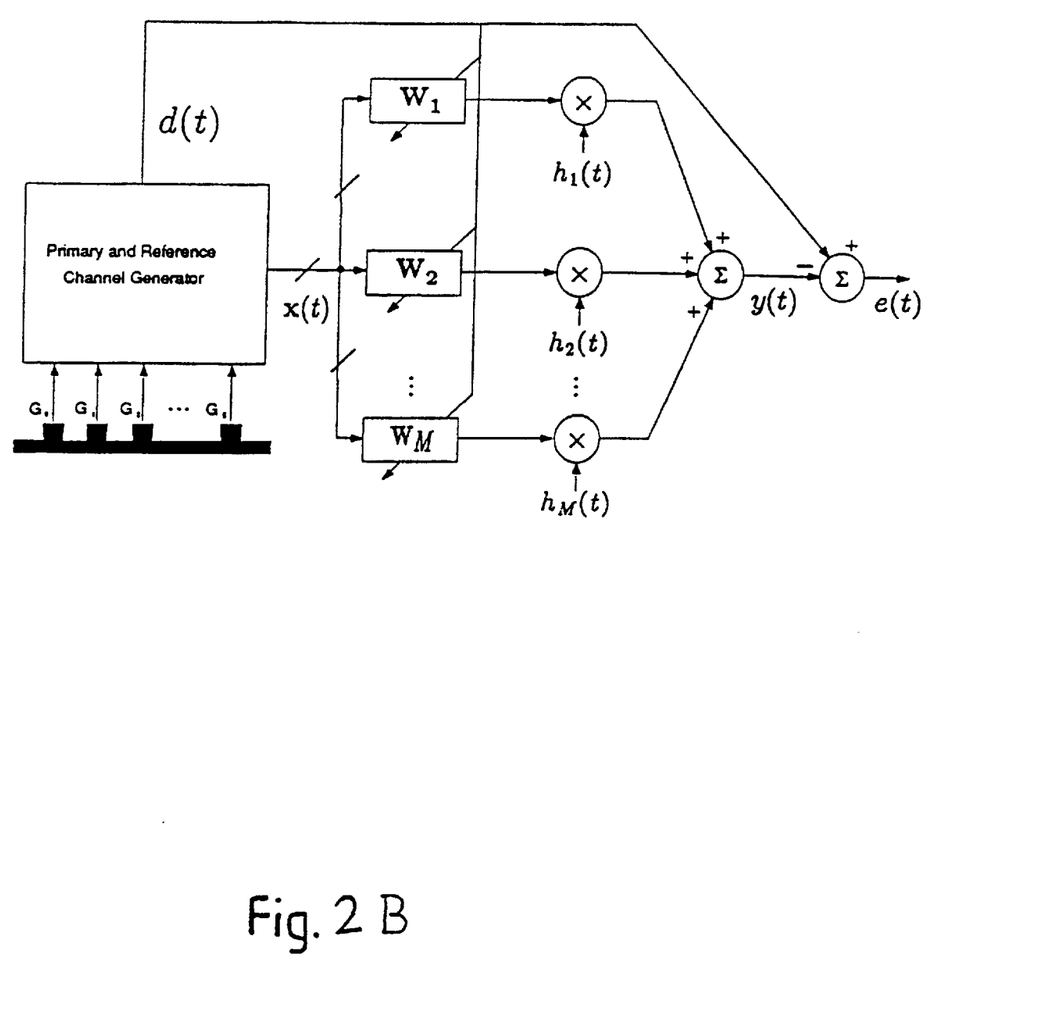
FIG. 2B shows a variant of the method of FIG. 2.

In FIG. 2A the primary input is summed at the output of each filter 32. An equivalent method for determining e(t) is illustrated by FIG. 2B, where the window function $h_i(t)$ is multiplied with the output of each filter, and the primary channel is added after all outputs are combined.

The signal e(t) is also known as the error signal and a cost function J is defined which is equal to the sum of $e^2(t)$ over all the sample inputs i.e.

$$J = \sum_{t=1}^{T} e^2(t) \quad [7]$$

where T is the total number of samples. The cost function J corresponds to the total error energy and by minimising the cost function, and thus minimising the global criterion, e(t) becomes the least square estimate of s(t), i.e. the pure signal with no noise.

One way of minimising the global criterion is by using the windows $h_i(t)$ to ensure that the filters are local in time, i.e. the arrays have a finite time span, and can deal with non-stationary noise. The windows may be triangular with a length of 100 samples.

The windows 42 are constrained by $$\sum_{i=1}^{M} h_i(t) = 1 \quad [8]$$

for t=1, 2, ..., T, where T is the total number of samples, and $$h_i(t)h_j(t)=0 \quad [9]$$

for j≠i−1,i,i+1. The first constraint ensures that the filter bank 34 is equivalent to the single filter case if all the local filters 32 are identical. The second constraint ensures that the windows have compact support. Use of these two constraints enables the global optimisation of the error signal e(t) to be solved.

The optimisation problem is $$\min_{w_1,\ldots,w_M} \sum_{t=1}^{T} e^2(t). \quad [10]$$

The total error energy can be expanded as $$\sum_{t=1}^{T} e^2(t) = \sum_{t=1}^{T} \left[\sum_{i=1}^{M} h_i(t)f_i(t)\right]^2 = \quad [11]$$

$$= \sum_{t=1}^{T} \left[\sum_{i=1}^{M} h_i^2(t)f_i^2(t) + \sum_{i=1}^{M} \sum_{j=i-1}^{i+1} h_i(t)h_j(t)f_i(t)f_j(t)\right]$$

where $f_i(t)$ is the local error function associated with local filter $w_i$:

$$f_i(t) = d(t) - w_i^T(t)x(t). \quad [12]$$

It can be seen from equation [11] that the optimisation problem leads to a large number of coupled equations for the filters. Using the second condition, eq. [9], imposed on the windows and the following approximation [13] for the second term in equation [11] the equations can be decoupled.

$$\sum_{t=1}^{T} \sum_{i=1}^{N} \sum_{j=i-1}^{i+1} h_i(t)h_j(t)f_i(t)f_j(t) \approx \sum_{t=1}^{T} \sum_{i=1}^{N} \sum_{j=i-1}^{i+1} h_i(t)h_j(t)f_i^2(t). \quad [13]$$

This is a very mild approximation as firstly, the approximated second term in [11] is dominated by the first term and secondly, the approximation is milder than the approximation $w_i = w_{i+1}$ or $w_i = w_{i-1}$. The approximation of equation [13] requires that neighbouring filters produce similar results when applied to the same input data in time regions where adjacent windows overlap, instead of requiring that neighbouring filters are similar on a point by point basis. Thus, the approximation is similar to requiring that the integral of two functions are close, rather than the functions themselves.

Whilst optimisation leads to a large number of coupled equations for the filters, the approximation of equation [13] decouples the optimisation so that $$\min_{w_1,\ldots,w_M} \sum_{t=1}^{T} e^2(t) \Leftrightarrow \min_{w_i} \sum_{t=1}^{T} h_i(t)f^2(t) \quad [14]$$

with $i=1,2,\ldots M$.

The matrix normal equations for the components of the filter bank can be obtained, for example by setting the gradient to zero, or by using the principle of orthogonality, to give:

$$\left[\sum_{t=1}^{T} h_i(t)x(t)x^T(t)\right]w_i = \sum_{t=1}^{T} h_i(t)d(t)x(t). \quad [15]$$

This can be solved by various methods, two of which are the method of principal components and the damped least squares approach.

The right hand side of quation [15] can be interpreted as a product of a correlation matrix $\Phi$ and the filter coefficient $w_i$. The singular value decomposition of $\Phi$ is $$\Phi = \sum_{n=1}^{KL} \sigma_n u_n u_n^T, \quad [15.1]$$

where $\sigma_1 > \sigma_2 > \ldots > \sigma_{NL}$ are the singular values. The singular value decomposition gives good results, even if the matrix is ill-conditioned. Another advantage of employing the singular value decomposition is that it allows the use of the method of principal components.

In systems and control theory literature, the term 'principal components' refers to the dominant terms in the singular value decomposition of a square matrix, see for example B. C. Moore, "Principal component analysis in linear systems:controllability, observability, and model reduction", IEEE Trans. Autom. Control, Vol. AC-26, pp. 17–31, 1981.

The principal components matrix $\Phi_1$ corresponding to the matrix $\Phi$ is $$\Phi_1 = \sum_{n=1}^{p} \sigma_n u_n u_n^T \quad [15.2]$$

where $1 \leq p \leq NL$. The principal components matrix $\Phi_1$ provides an optimal low-rank approximant to $\Phi$. The optimisation problem of eq. [15] can then be solved by determining the inverse $\Phi_1^{-1}$.

The use of the principal components approach in combination with the time delays to define the filter supports allows the filters to focus on wave components (i.e. \ the ground-roll) which have a certain moveout and coherency over an extended region of the data set. Furthermore, using only a given number of principal components results in only the most dominant coherent components influencing the computation of the filter coefficients. The number of principal components is an adjustable parameter which allows the user to vary the strength of the filter. The greater the number of principal components used, the heavier the filtering. In general, the smaller the signal-to-noise ratio, the heavier the filtering that should be applied.

An alternative approach of solving the matrix equations is the damped least squares solution using:

$$\Phi_2 = \Phi + \varepsilon^2 I = \sum_{n=1}^{NL}(\sigma_n + \varepsilon^2)u_n u_n^T \quad [15.3]$$

$$\Phi_2^{-1} = (\Phi + \varepsilon^2 I)^{-1} = \sum_{n=1}^{NL}(\sigma_n + \varepsilon^2)^{-1}u_n u_n^T$$

where I is the NL×NL identity matrix, and $\epsilon^2$ is a small parameter. In the damped least squares approach, ill-conditioning is prevented, and the principal components result is approximated, in the sense that components with small associated singular values are de-emphasized. The contributions of the principal components are only slightly altered. The main advantage of this approach is that, since the matrix $\Phi + \epsilon^2 I$ is symmetric, it can be solved using for example the Cholesky decomposition, which is much faster than the singular value decomposition.

Whereas in the variant of the invention as described above, the multichannel filter supports are fixed at the beginning of the application, depending on the dominant ground-roll velocity, minimum signal protection gap and filter length. This setup is not ideal for the application where the horizontal components are used as reference, since the effective moveout between the vertical and horizontal components is not fixed between the three channels. There it might be advantageous to vary the filter lengths, i.e., to locally adjust the multichannel filter supports so as to follow the moveout of highest correlation.

In the following, a number of methods for generating the interference reference channel 30 for use in a method according to the invention will be described by way of example.

Method 1—Multiple Reference Channels Based on Moveout Differentiation

Figure 3:
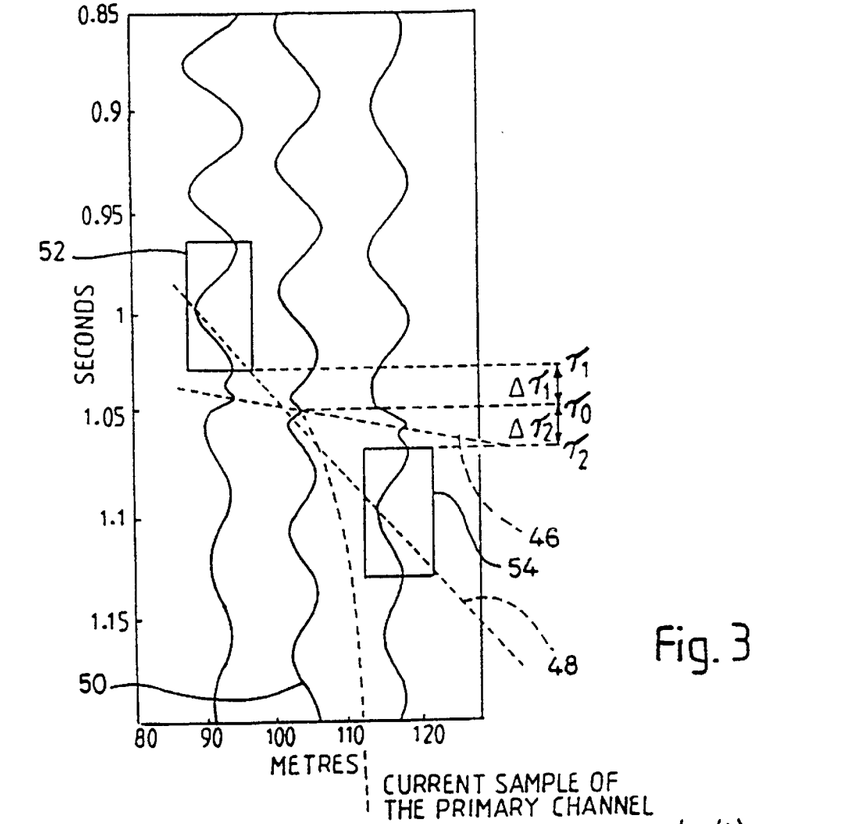
FIG. 3 shows sampling of the data signals to support the filter coefficients used in the adaptive interference cancelling.
Figure 4:
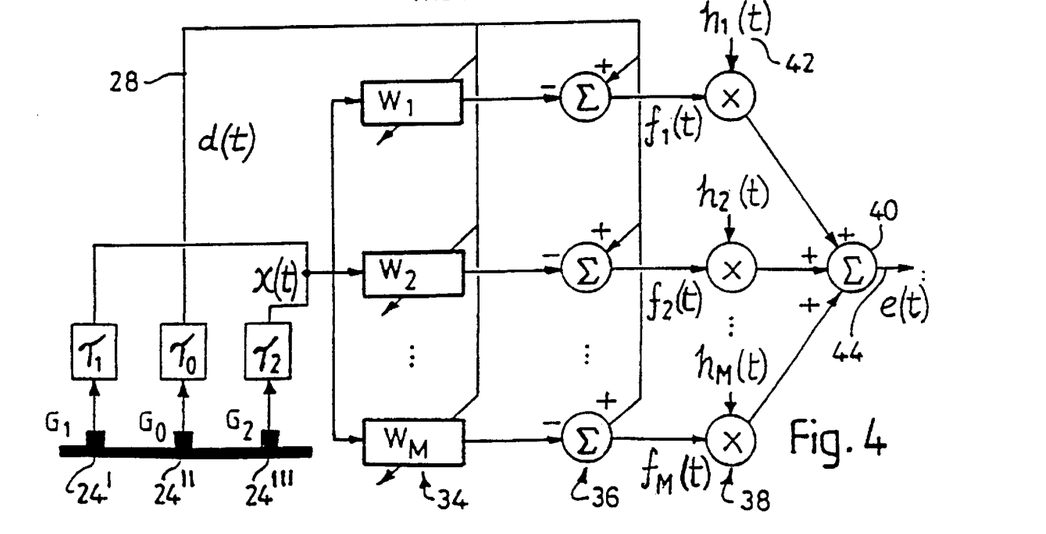
FIG. 4 shows a data-adaptive multichannel filter bank according to the invention applying moveout differentiation to the reference channel.

In a seismic gather, the moveout of the reflected energy in general has a different moveout than the coherent noise, such as the ground roll. This property can be used to apply adaptive interference cancelling to the suppression of ground roll. In FIG. 3 an example of traces obtained from seismic survey is shown. The moveout of the seismic reflection 46 and the moveout of the ground roll 48 have different gradients. As can be seen, the ground roll has a much steeper dip than the seismic reflection. On the primary channel 50, i.e. the central trace, the seismic signal is superimposed on a certain phase of the ground roll. On the adjacent traces, the same phase of the ground roll does not overlap with the seismic signal. Thus by appropriate sampling of the adjacent traces, a noise reference can be obtained for use in adaptive interference cancelling. The sampling areas 52, 54 provide support of the filter coefficients acting on the reference-channel and are obtained at a defined distance from the current sample of the primary trace 50. The relative supports of the multichannel filter components can be adjusted by delaying the primary and the reference channel inputs by appropriate amounts. Employing the described method of generating the reference channels, the resulting data-adaptive multichannel filter is shown in FIG. 4, where equivalent elements to those already described in relation to FIG. 2 are shown with corresponding reference numerals. In FIGS. 3 and 4, $$\Delta\tau_1 = \tau_0 - \tau_1 \quad [16]$$

and $$\Delta\tau_2 = \tau_2 - \tau_0 - L \quad [17]$$

where L is the number of coefficients used in the adaptive filter associated with the second sampling.

For illustration purposes, in the rest of this application, the nearest traces on either side of the trace to be filtered are used as noise reference.

The choice of $\Delta\tau_i$ mainly depends on two factors, namely the autocorrelation function of the signature of the seismic reflection, and the moveout of the ground roll. The autocorrelation function of the signature of the seismic reflection depends on the power spectrum of the seismic reflection. In general, the window in time defined by $\Delta\tau_i$ is chosen to be larger than the lag beyond which the autocorrelation function of the signature of the seismic reflection has negligible values. Secondly, the sampling of the nearest traces is chosen so that the dominant moveout of the ground roll bisects the sampling area. This reduces effects due to the dispersive nature of the ground roll and its range of apparent velocities.

Figure 5:
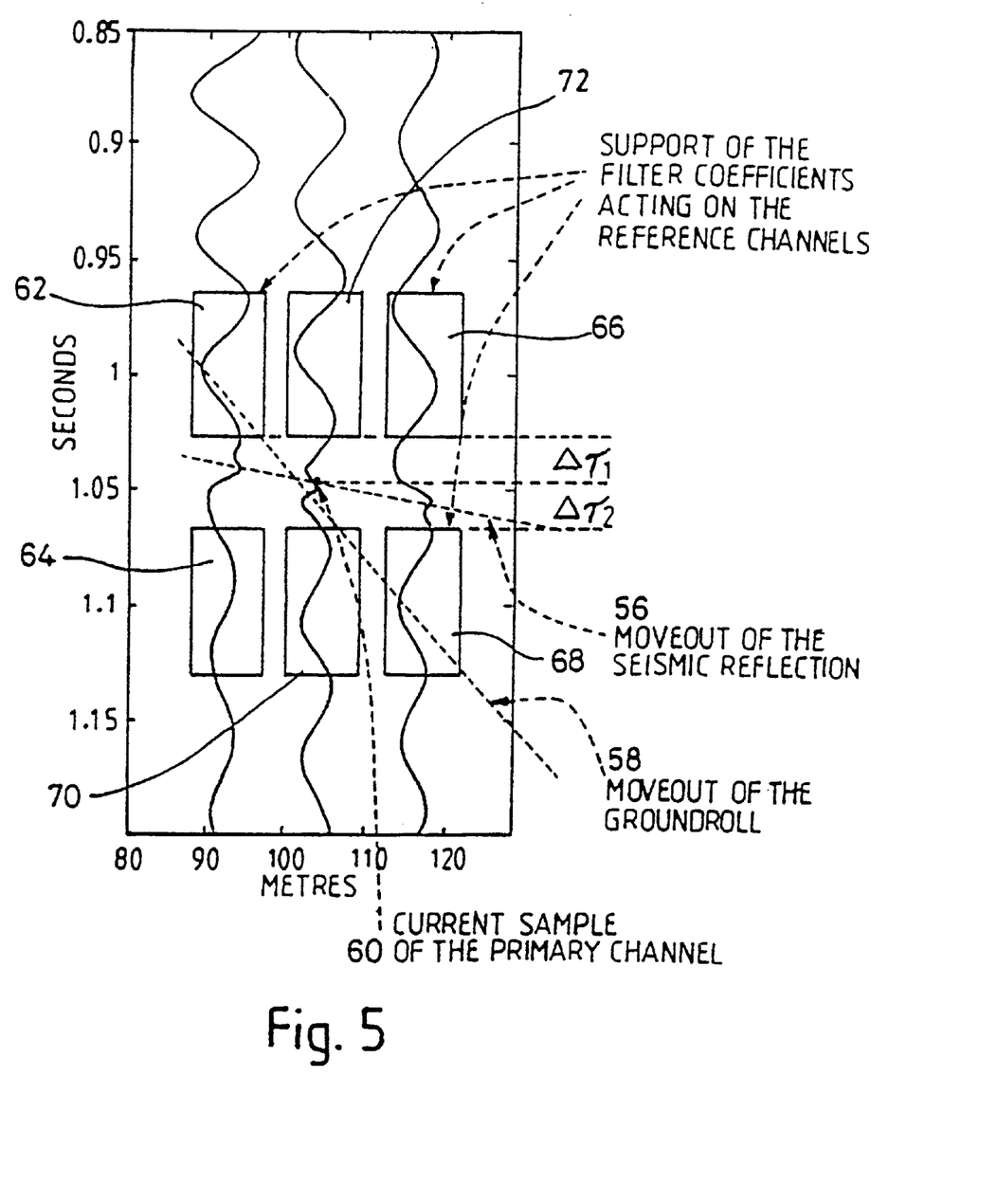
FIG. 5 shows an alternative sampling of the data signals to support the filter coefficients used in the adaptive interference cancelling.

Method 2—Multiple Reference Channels Based on Moveout and Spatiotemporal Coherency Differentiation The target signal and the interference may have both different moveout (apparent velocity) and spatiotemporal coherency. This often occurs in surface seismic acquisition. The ground roll not only has a different moveout than the reflection signal, but has significantly more spatiotemporal coherency than the seismic reflections, especially in the temporal direction. This enables a generalisation to be made for defining the supports of the multichannel filter components outlined in Method 1. FIG. 5 shows how the generalisation may be used with traces obtained from a seismic survey. The moveout of the seismic signal 56 and the moveout of the ground roll 58 are again of different gradients. Two regions of filter support are specified for each nearest trace either side of the primary channel 60. As for the sampling carried out in FIG. 3, the sampling areas, or filter support, 62, 64, 66, 68 leave a band of time samples around the central sample defined by to. This is so as to protect the seismic signal.

The ground roll often has temporal coherence over time scales much greater than the seismic signal, and in such circumstances appropriate portions 70, 72 of the central trace (ie the primary channel) may be used as a reference.

This generalisation can be very useful in many applications. When two reference channels are chosen such that one is causal and the other anti-causal with respect to the incidence direction of the direct ground roll as described in Method 1, the output will contain the reflecting event, as well as a precursor (a leading event) which is approximately half the lowpass version of the event, as well as a similar postcursor (a lagging event). If a: minimum-phase response is required at all the processing steps, the presence of a precursor is not desirable. If the reference channel is determined by using reference traces which are nearer the source with respect to the primary channel, or by using sections of reference traces that are causal with respect to the output point, then only a postcursor will be present in the filtered data.

When interference references are generated only by using time delays to define the filter supports and without the use of any preprocessing, the presence of reflectors on the reference channels produces small precursors and/or postcursors on the processed primary channel.

For example, when two adjacent traces are used for reference a precursor and a postcursor are produced. This effect can also be observed in the frequency domain: when the reference channels focus on a ground-roll phase with the same polarity as the ground-roll phase in the primary channel, the low-frequency gain of each filter is approximately $-1/K$, where K is the number of reference channels. Therefore, there is a null in the overall response at zero frequency.

The roll-off depends on K; for K=4 the corner frequency is about 5 Hz, for K=2 it's typically about 11–12 Hz. The response also shows some gain in middle frequencies. When the reference channels focus ona ground-roll phase with the opposite polarity as the ground-roll phase in the primary channel, the low-frequency gain of each filter is approximately $+1/K$. Then there is no low-frequency roll-off; there is usually a dip in middle frequencies.

Since the responses with positive and negative polarity are quite complementary, one possibility is to run adaptive interference cancelling on the same data twice with alternating polarities, and at each frequency choose the response from the two experiments where the magnitude of the response is the highest, which is greater than unity at most frequencies. Thus, the deconvolution gain is less than unity at most frequencies, thus reducing the noise even further while more ideally preserving the seismic reflection signature.

Method 3—Single Reference Channel Based on Median Stack

The median filtering of a sequence of numbers is performed by passing a rectangular window over the sequence and replacing each point in the sequence with the median value of the points within the window centered on the current point. This 1-D median filtering operation can be applied on a 2-D data set in a specified direction to obtain an estimate of wave components incident in that direction.

Figure 6:
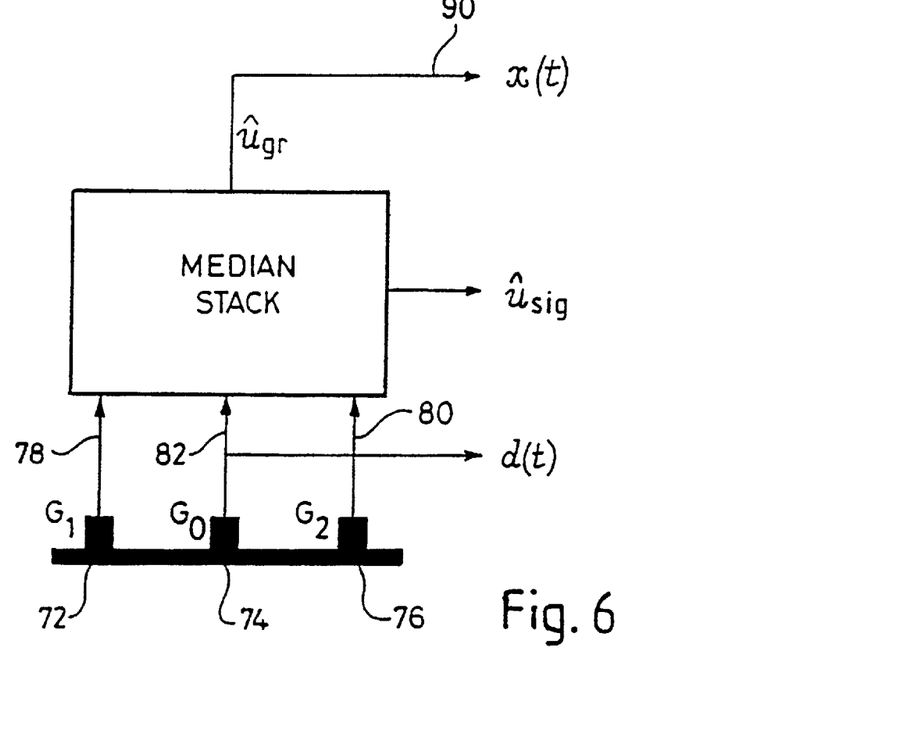
FIG. 6 shows generation of the reference channel based on moveout differentiation and median stack in the method according to the invention.

The reference channel can be generated by adding the ground roll along the dominant moveout using a median stack operation as shown in FIG. 6. The stacking operation is carried out locally on typically 3 to 5 neighbouring traces. As shown in FIG. 6, the sensing means, or geophones, 72, 74, 76 produce reference traces 78 and 80 and a primary trace 82. The traces are used in a median stack operation. Unlike the mean, or conventional stacking operation, the median operation does not smear the seismic reflections (which do not share the same moveout as the ground roll), but suppresses them. Thus, the reference channel 90 produced by the median stack operation contains a better estimate of the interfering ground roll with less contamination by the seismic signal of interest than is possible using conventional mean stacking. This method may be performed on overlapping windows to readjust the stacking moveout.

Figure 7:
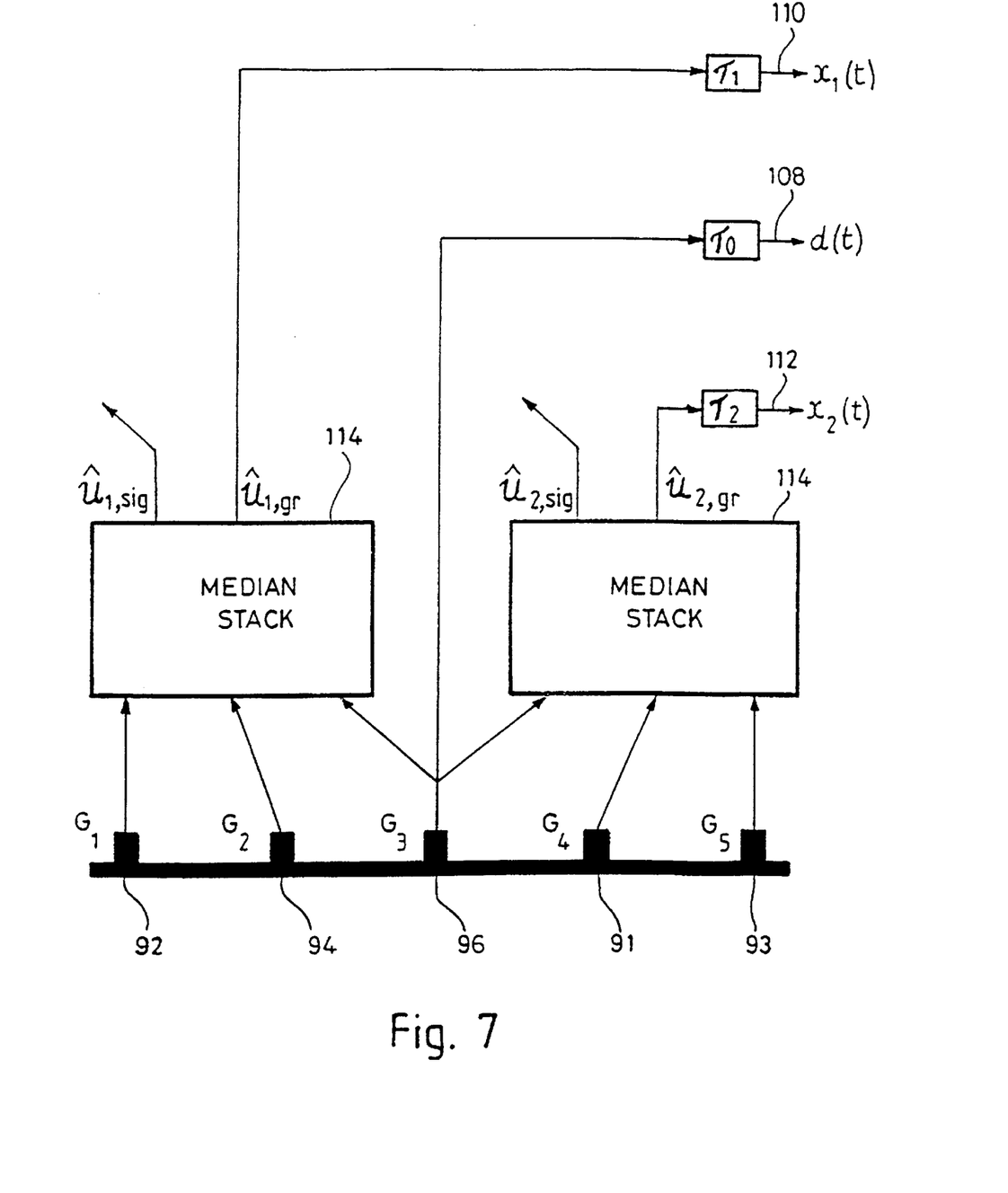
FIG. 7 shows generation of the reference channel based on median stack and moveout differentiation.

Method 4—Multiple Reference Channels Based on Median Stack and Moveout Differentiation The previous embodiment is further developed by firstly applying median stack 114 and thereafter time shifts $\tau_1$, $\tau_2$ to generate the reference channels $x_1(t)$, $x_2(t)$. FIG. 7 demonstrates how five traces 91, 92, 93, 94, 96 can thus be used to generate two reference channels. Signal energy as leaking through the median filter is further suppressed. This embodiment is especially useful when filtering a small number of traces or data from a small number of geophones or hydrophones.

Method 5—Single Reference Channel Based on Polarisation Differentiation

Ground roll and seismic reflections are often polarised differently, with seismic reflections being linearly polarised and ground roll often appearing to be elliptically polarised. Polarisation filtering is used to distinguish seismic events by the inherent polarisation when the seismic wavefield is measured by multicomponent sensing means, or geophones.

Figure 8:
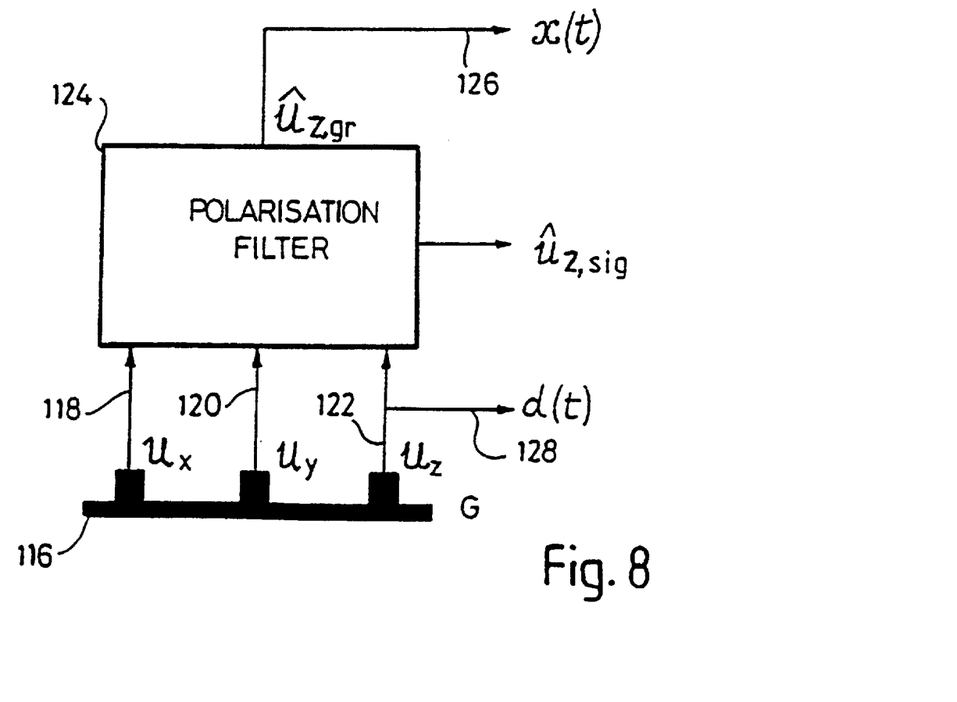
FIG. 8 shows generation of the reference channel based on polarisation differentiation.

A method for obtaining a reference channel from polarisation filtering of the components produced from a multicomponent sensing means is shown in FIG. 8. A multicomponent sensing means 116 detects three orthogonal components $u_x$ 118, $u_y$ 120, $u_z$ 122 of the reflected wave. The polarisation filter 124 filters the elliptically polarised ground roll signal and the filtered signal is used as the noise reference 126 in adaptive interference cancelling. The original unfiltered trace 128 is used as the primary channel. Application of the adaptive filter reduces the residual energy and thus improves ground roll attenuation. This method uses data from a single three component (3 C) geophone and may be applied to each individual component to recover ground roll attenuation multicomponent data.

Figure 9:
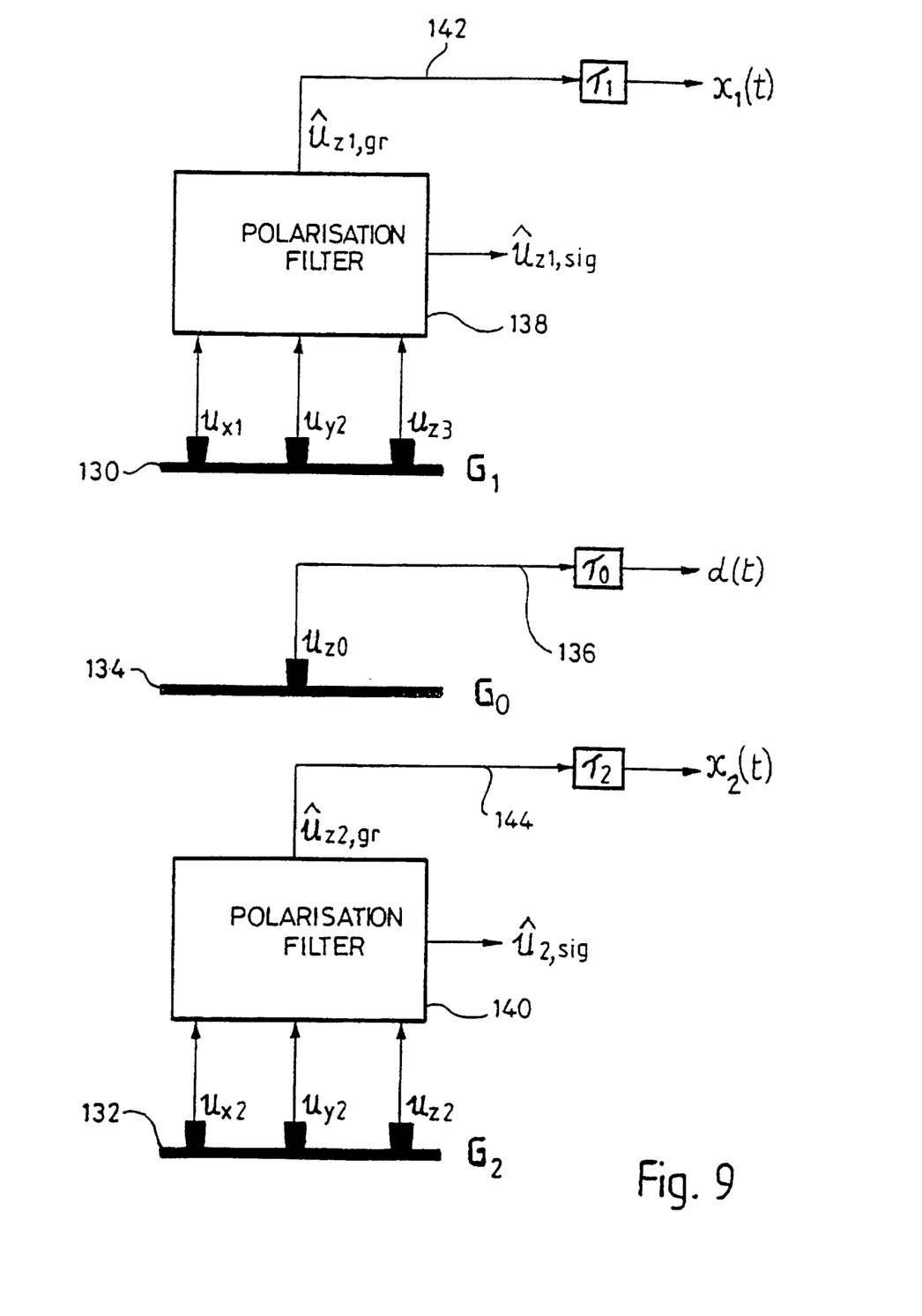
FIG. 9 shows generation of the reference channel based on polarisation and moveout differentiation.

Method 6—Multiple Reference Channels Based on Polarisation and Moveout Differentiation As shown in FIG. 9, this method uses reference geophones 130, 132 of at least 3 C and a primary geophone 134. The primary geophone produces a primary channel 136, defined as at time $t_0$. Polarisation filters 138 and 140 are used as in Method 4 to filter the elliptically polarised ground roll signal and produce reference traces 142, 144. The reference traces 142, 144 are delayed by $t_1$ and $t_2$ so as to sample the reference traces in accordance with the moveout differentiation method as described in Method 1. The delayed reference traces are then used to provide the reference channel. It is possible to perform this method using two reference geophones, the primary channel being obtained from one of the components before filtering.

In this method of obtaining a reference channel, the two completely independent criteria of moveout and polarisation are used simultaneously to differentiate between the seismic signal and the ground roll. This method produces a more robust attenuation of ground roll than Method 4.

Method 7—Multiple Reference Channels Generated using Iterated Adaptive Interference Cancelling As discussed above, the concept of adaptive interference cancelling relies on the absence of signal components in the noise reference channels. In reality, this is rarely the case, there is almost always some signal leakage. The noise estimate from an initial run of adaptive interference cancelling may be used as noise reference in a second run, which improves the signal and noise separation obtained from the original data. Use of an iterative approach, using the filtered output signal to successively refine the output signal, may be used as many times as is deemed advantageous. For methods with multiple reference channels, this method also has the effect of increasing the effective array aperture with only linear increase in computational complexity.

Method 8—Parametric Wavefield Decomposition as Reference Generator

In parametric wavefield decomposition, the problem of decomposing a seismic data set into its constituent wavefields is formulated as a parametric inversion, where each wavefield is modelled by its Fourier components and by frequency-independent parameters (e.g. apparent slowness). The method solves for the wavefield parameters by minimizing the least squares error between modelled and data waveforms in the frequency domain. Since the apparent slowness parameters enter the problem nonlinearly, gradient-based search techniques are used to determine optimum parameter values. The wavefields are then reconstructed from the data by solving a linear system at each frequency followed by inverse Fourier transform.

The method of parametric wavefield decomposition can be used to initially separate the data into its ground-roll and seismic reflection signal components. The ground-roll estimate provided by the parametric wavefield decomposition is then used by adaptive interference cancelling as noise reference. Parametric wavefield decomposition in general achieves good ground-roll and signal separation; however it is affected by amplitude and time perturbations in the data. Combined use of parametric wavefield decomposition and adaptive interference cancelling thus gives improved results.

This embodiment can be further developed by firstly applying parametric wavefield decomposition and thereafter time shifts to generate reference channels. Signal energy that may leak through parametric wavefield decomposition is further suppressed. The method of parametric wavefield decomposition is described for example in: C. Esmersoy, "Inversion of P and SV waves from multicomponent offset vertical seismic profiles," Geophysics, Vol. 55, pp. 39–50, 1990.

Method 9—Horizontal Components as Reference Channels

In multicomponent recording, most of the compressional body-wave energy is on the vertical component. The horizontal components (transverse and radial) contain ground-roll and shear-wave energy, thus they can be utilized as interference references in adaptive interference cancelling. Unlike the approaches based on polarization filtering which assume that the ground-roll is elliptically polarized, this version of 3-C adaptive interference cancelling assumes that locally (in the time domain) there is a certain but unknown relationship between the vertical and horizontal components of the ground-roll, and effectively estimates this relationship. Since seismic reflection signals will also be present in the horizontal components, the reference channels are generated by applying time shifts to the horizontal components.

The general idea of using horizontally sensitive geophones as surface-wave detectors to adaptively filter the vertical component is for example described in a patent by G. A. Crews and D. R. Martinez (U.S. Pat. No. 4,890,264).

The implementation of a method in accordance with the invention will now be described for three dimensional surface surveys, i.e. land based surveys.

Implementation for 3-D Surveys

In 3-D surface seismic surveys, the current practice is to deploy 2-D aerial arrays of geophones and collect data for varying azimuthal distributions of source locations. These arrays typically contain of the order of 24 geophones, and the output signal is obtained by hardwiring the geophones and summing their outputs.

Adaptive interference cancelling as described in this work may be used in 3-D surveys, with an aerial pattern of geophones, or net, for example a hexagon layout of geophones with a central geophone. If the direction of incidence of the direct ground roll (or, equivalently, the source location) is not supplied at the time of processing, this may be estimated by cross-correlating an arbitrary reference trace with the other traces. Each trace (geophone output) is in turn selected as the primary channel, and a number of corresponding reference traces are chosen so that sufficient ground roll moveout exists between the primary and the reference traces. All the filtered traces obtained by using the method according to the invention are stacked either as in conventional beamforming (mean operation), or using median stacking. The delay of each filtered trace by different $\tau_1$ and $\tau_2$ values ensures that the precursor and postcursor features of the signal are in general de-emphasised, while the seismic reflection is emphasised.

The areal dimensions of these geophones nets are much smaller than the hardwired aerial arrays used at present. In addition the subsequent stacking of the filtered traces preserves more of the signal bandwidth than the current practice, particularly for large source to receiver offset.

Implementation using Perfect Reconstruction Filter Banks

In most seismic surveys, the coherent noise occupies only a fraction of the temporal bandwidth available. For example, in the test data used in this work, the Nyquist frequency is 250 Hz, while most of the ground roll energy is under 30 Hz. Concentrating filtering efforts to the frequency band where the coherent noise resides is desirable to reduce computational cost. One means of achieving this aim involves adding QMF (quadrature mirror filter) perfect reconstruction filter banks to the noise suppression system using adaptive multichannel filter banks. Thus two filter banks are effectively involved in the system. The QMF filter bank is used to decompose the traces into frequency bands and decimate before adaptive filtering is applied, and then used for resynthesising. Using the QMF filter banks to decimate reduces the number of points to be processed and also allows reduction in the number of coefficients in the adaptive filters, bringing in significant savings in computer processing time and computer memory requirements.

Due to the frequency overlap needed in the design of QMF filter banks, there is some leakage between bands. The effect of this leakage can be addressed by widening the band that is processed. Additional suppression of residual ground roll can be achieved by forming conventional groups which can be seen as simple k-domain filters or beamformers. The methods in accordance with the invention avoid data processing problems where aliased noise such as ground roll is present.

Due to the frequency overlap needed in the design of QMF filter banks, there is some leakage between bands. The effect of this leakage can be addressed by widening the band that is processed. Additional suppression of residual ground roll can be achieved by forming conventional groups which can be seen as simple k-domain filters or beamformers. The methods in accordance with the invention avoid data processing problems where aliased noise such as ground roll is present.

Aliased ground roll when the geophone (or source) sampling distance is greater than that required by the Nyquist theorem. In some acquisition geometries this may be done by design to reduce the number of geophones (and/or sources) deployed in the field.

Methods which require proper sampling, like k or f-k domain filters are not able to separate the signal and the ground roll effectively as frequency domain (k or f-k) filters seek to separate the seismic signal and the ground roll in one step by assigning distinct regions in the transform domain to the signal and to the noise. The presence of aliasing prevents this. The method according to the invention does not transform the data, so it is not affected by aliasing. It focuses on the noise and removes it; the remaining data is the filtered signal.

The application of the method in accordance with the invention to processing of a real data set when compared with processing by conventional methods is now discussed. The data set used was obtained from a common receiver gather, where the spacing between Vibroseis shot point locations was 4 meters. In order to be able to inspect the effect of processing on both the signal and the noise before stack, two synthetic reflections were added. Further evaluation of the processing was performed after adding arbitrarily spike-type noise to the data set.

Performance of the conventional grouping techniques was simulated by arithmetic averaging of adjacent traces in moving windows. With a conventional group of 6 (20 meter group), some ground roll suppression could be achieved, but the distortion of the seismic event has increased.

Where the data was analysed using a known normalised LMS algorithm in the adaptive interference cancellation, the normalised LMS algorithm failed to track the ground roll. The method of adaptive interference-cancelling using the LMS algorithm has limited success in suppressing the ground roll. The LMS algorithm does not converge fast enough to cope with the transient and non-stationary nature of the ground roll.

On applying the method according to the present invention to the test data set, the use of the multichannel filter bank preserves the seismic reflections well, and the ground roll is effectively suppressed. In this example K=2, ie there were two reference channels for each primary channel, and L=30, ie there were 30 coefficients for each channel. The output windows $h_i(t)$ were triangular with length 100; $\Delta\tau_1 = \Delta\tau_2 = 3$ samples; p=5 was the number of principal components used.

The method in accordance with the invention may be used with incoherent noise sources other than ground roll, such as steamer noise and rig noise in marine surveys, or sea bottom surveys.

Implementation in Marine Environment

In marine seismic surveys, an acoustic source generates waves which travel through the water and into the earth. These are then reflected or refracted by the sub-surface geological formations, travel back through the water and are recorded by long hydrophone arrays which are towed near the surface of the water behind a seismic vessel. The hydrophones are mounted in streamer cables, or streamers. There are usually 2–12 streamers towed which are each several kilometers long. The streamers are made up of 100 meter long sections; each section consists of hydrophones inside an oil-filled skin. Stress-wires and spacers form the internal skeleton of the streamer.

While the streamers are being towed behind the vessel, self-noise is generated due to a variety of sources. The lurching of the vessel, especially in rough seas, causes vibrations in the stress-wires which interact with the connectors and the oil-filled skin, generating bulge waves (or breathing waves) which propagate down the streamers. The pressure variations are detected by the hydrophones, adding and corrupting the detected seismic signals. As the streamer moves through the water, boundary layer turbulence causes pressure fluctuations at the outer skin wall, which are again coupled to the hydrophones.

The adaptive interference cancelling methods according to the invention are directly applicable to the bulge wave. Previous uses of adaptive interference cancelling in relation to make seismic surveys have had to utilize special sensors (stress sensors or accelerometers) to form noise reference channels, see U.S. Pat. No. 4,821,241, U.S. Pat. No. 5,251,183. The methods according to the invention form noise reference channels using only the hydrophone data. The methods using 3 component data and polarisation filtering are not applicable to the streamer noise problem, but the other methods are applicable.

In some marine seismic surveys, there is interference which is incident in the cross-line direction to the streamers. One such case is the presence of interference coming from drilling activity on an oil rig. Since there may be as few as two streamers being towed behind the vessel, an array of hydrophones formed in the direction of the interference would not have sufficient number of hydrophones to utilise conventional beamforming, or data-independent multichannel filtering, such as f-k filtering. On the other hand, the adaptive interference cancelling methods according to the invention are directly applicable to this problem. Along the cross-line array, the interference will have greater moveout, or apparent slowness than the seismic signals, and this feature is exploited in applying the adaptive interference cancelling methods.

The use of the methods according to the present invention permits a large reduction in the numbers of geophones or hydrophones required to acquire seismic data.

I claim:

1. A method for filtering noise from discrete noisy seismic signals in a time interval $((1, \ldots, T))$ said method comprising the steps of using said noisy seismic signals for determining at least one reference channel $(x(t))$ for said time interval as an estimate of said noise;

determining coefficients for M temporally local filters $(w(i,t))$, said filters forming a filter bank, and M being a number equal to or larger than two, by minimizing a cost function $(J(t))$ representing a measure of the error of the output of said filter bank; and applying said filter bank to said at least one estimate $(x(t))$ to determine M filtered estimates of said noise.

2. The method according to claim 1, wherein the cost function $(J(t))$ is temporally global, representing a measure of the error of the total output of said filter bank in the time interval $((1, \ldots, T))$.

3. The method according to claim 1, including the step of multiplying M filtered estimates with temporal window functions $((h(i,t)))$.

4. The method according to claim 3, wherein the temporal window functions are characterized by the requirement that only adjoining windows overlap.

5. The method of claim 3, wherein the cost function $(J(t))$ is minimized using the approximation that the sum, weighted by window functions, of the output of adjacent filters of the M filters $(w(i,t))$ is equal when applied to the same signal in time regions where said window functions overlap.

6. The method of claim 1, wherein the discrete noisy signals used as input are recordings from individual seismic sensors prior to any group forming techniques.

7. The method according to claim 1, wherein global optimization of the filtered output signal is solved by the method of principal components.

8. The method according to claim 1, wherein the global optimization of the filtered output signal is solved by a damped least squares approach.

9. The method according to claim 7, wherein the number of principal components is adjusted to vary the degree of filtering.

10. The method according to claim 1, wherein the M local filters are adaptive.

11. The method according to claim 10, wherein each local filter is a multichannel filter.

12. The method according to claim 1, wherein the filtered output signal is reprocessed in an iterative manner to further filter the noise.

13. The method according to claim 1, wherein the reference signal is obtained by moveout differentiation of data signals.

14. The method according to claim 1, wherein the reference signal is obtained by median stacking.

15. The method according to claim 14, wherein the median stacking is followed by moveout differentiation of the stacked signals.

16. The method according to claim 1, wherein the seismic data is obtained from multicomponent receivers, and the reference signal is obtained by polarisation filtering of each component sensed by the receivers.

17. The method according to claim 15, wherein polarisation filtering is combined with moveout differentiation.

* * * * *